(12) United States Patent
Zhao et al.

(10) Patent No.: US 10,916,016 B2
(45) Date of Patent: Feb. 9, 2021

(54) IMAGE PROCESSING APPARATUS AND METHOD AND MONITORING SYSTEM

(71) Applicant: CANON KABUSHIKI KAISHA, Tokyo (JP)

(72) Inventors: Xuyu Zhao, Beijing (CN); Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 16/140,303

(22) Filed: Sep. 24, 2018

(65) Prior Publication Data
US 2019/0102888 A1    Apr. 4, 2019

(30) Foreign Application Priority Data

Sep. 30, 2017  (CN) .......................... 2017 1 0916408

(51) Int. Cl.
*G06T 7/194*        (2017.01)
*G06T 7/73*         (2017.01)
(Continued)

(52) U.S. Cl.
CPC .......... *G06T 7/194* (2017.01); *G06K 9/00718* (2013.01); *G06K 9/3241* (2013.01); *G06K 9/38* (2013.01); *G06T 7/11* (2017.01); *G06T 7/73* (2017.01); *G06T 2207/10016* (2013.01); *G06T 2207/30236* (2013.01)

(58) Field of Classification Search
CPC ................................ G06T 7/194; G06T 7/215
See application file for complete search history.

(56) References Cited

U.S. PATENT DOCUMENTS

| 2002/0037103 A1* | 3/2002 | Hong | ........................ G06T 7/11 382/173 |
| 2004/0105573 A1* | 6/2004 | Neumann | ............... G06T 17/00 382/103 |

(Continued)

OTHER PUBLICATIONS

Yun-Fang Zhu, "Moving Objects Detection and Segmentation Based on Background Subtraction and Image Over-Segmentation", Journal of Software, vol. 6, No. 7, Jul. 2011.

*Primary Examiner* — Wen W Huang
(74) *Attorney, Agent, or Firm* — Canon U.S.A., Inc. IP Division (57) ABSTRACT

Acquiring a current image from an inputted video and a background model which comprises a background image and foreground/background classification information of visual elements; classifying the visual elements in the current image as foreground or background; determining similarity measures between the current image and groups in the background model, wherein visual elements in the current image are the visual elements in the current image which are classified as the foreground, wherein visual elements in the groups in the background model are the visual elements whose classification information is the foreground, and wherein the visual elements in the groups in the background model are the visual elements which neighbour to corresponding portions of the visual elements in the groups in the current image; and identifying whether the visual elements in the current image which are classified as the foreground are falsely classified or not according to the determined similarity measures.

6 Claims, 5 Drawing Sheets

(51) Int. Cl.
*G06K 9/32* (2006.01)
*G06K 9/00* (2006.01)
*G06K 9/38* (2006.01)
*G06T 7/11* (2017.01)

(56) References Cited

U.S. PATENT DOCUMENTS

| | | | | |
|---|---|---|---|---|
| 2006/0034520 A1* | 2/2006 | Toyama | ............... | G06K 9/38 382/224 |
| 2006/0221248 A1* | 10/2006 | McGuire | ............... | H04N 5/272 348/587 |
| 2007/0273765 A1* | 11/2007 | Wang | ............... | G06K 9/38 348/152 |
| 2009/0087093 A1* | 4/2009 | Eaton | ............... | G06K 9/38 382/173 |
| 2014/0003713 A1* | 1/2014 | Seow | ............... | G06T 5/009 382/164 |
| 2015/0278616 A1* | 10/2015 | Li | ............... | G06K 9/00825 382/103 |
| 2015/0281715 A1* | 10/2015 | Lawrence | ............... | G06T 7/215 375/240.16 |
| 2015/0294179 A1* | 10/2015 | Fang | ............... | G06T 3/4007 382/199 |
| 2016/0125621 A1* | 5/2016 | Saitwal | ............... | G06K 9/38 382/165 |
| 2017/0083765 A1* | 3/2017 | Risinger | ............... | G06K 9/00624 |
| 2018/0352248 A1* | 12/2018 | Nishi | ............... | H04N 19/119 |

* cited by examiner

IMAGE PROCESSING APPARATUS AND METHOD AND MONITORING SYSTEM

CROSS REFERENCE TO RELATED APPLICATIONS

This application claims the benefit of Chinese Patent Application No. 201710916408.7, filed Sep. 30, 2017, which is hereby incorporated by reference herein in its entirety.

BACKGROUND OF THE INVENTION

Field of the Invention

The present invention relates to image processing, especially relates to, for example, foreground detection and monitoring.

Description of the Related Art

In image processing, in one aspect, an image (e.g. one image of a video) is generally made up of visual elements that are visible characteristics contributing to the appearance of the image. Wherein one visual element for example could be a pixel, a Discrete Cosine Transform (DCT) block which represents a group of pixels or a super-pixel which represents a group of pixels with the similar attributes (e.g. similar texture, similar color, similar luminance). In another aspect, especially in foreground detection, the existing background subtraction techniques are generally used to classify the visual elements in a current image of a video as "foreground" or "background" by comparing with a background image which is obtained based on the images of the video in a certain duration time previous to the current image. Wherein, the "foreground" refers to transient objects that appear in a scene captured on a video. Such transient objects may include, for example, moving humans or moving cars. The remaining part of the scene is considered to be the "background".

However, in some situations, false foreground detection will occur. For example, in one situation, water ripples or leaves moving in the wind which are actually the background will be falsely detected as the foreground, in case the visual elements of the water ripples or the leaves in the current image have certain changes by comparing with the corresponding visual elements in the background image. For example, in another situation, in case a graph segmentation algorithm with low accuracy is used to obtain the super-pixels (i.e. the visual elements), that is, the visual elements obtained from the current image may be not able to keep constant with the corresponding visual elements obtained from the previous images of the current image, thereby, the visual elements in the current image will also have certain changes by comparing with the corresponding visual elements in the background image, which will also result in the false foreground detection.

Therefore, in order to eliminate the above-mentioned false foreground detection as much as possible, one exemplary technique is disclosed in "Moving Objects Detection and Segmentation Based on Background Subtraction and Image Over-Segmentation" (Yun-fang Zhu, <Journal of Software> VOL. 6, NO. 7, July, 2011). As for one visual element in a current image, this exemplary technique detects this visual element as the foreground or the background according to a background confidence of this visual element. More specifically, in case the background confidence of this visual element is larger than a threshold, this visual element will be detected as the background. Wherein, the background confidence of this visual element is a ratio of a first number to a second number, the first number denotes a number of the visual elements in the current image which neighbour to this visual element and have same color as this visual element, and the second number denotes a number of the visual elements in the current image which neighbour to this visual element and are detected as the foreground.

However, in case a group of visual elements which neighbour to one visual element to be detected are falsely detected as foreground, both of the above-mentioned first number and the above-mentioned second number will be larger, which will make the background confidence of this visual element to be detected smaller and less than the threshold. Therefore, the above-mentioned false foreground detection could not be eliminated as much as possible, which makes the foreground detection less than desired.

SUMMARY OF THE INVENTION

Therefore, in view of the above recitations in Description of the Related Art, the present disclosure aims to solve at least one point of the issues as described above.

According to one aspect of the present invention, there is provided an image processing apparatus, comprising: an acquisition unit configured to acquire a current image from an inputted video and a background model which comprises a background image and classification information of visual elements, wherein the classification information of the visual elements comprises foreground and background; a classification unit configured to classify the visual elements in the current image as the foreground or the background according to the current image and the background image in the background model; a similarity measure determination unit configured to determine similarity measures between groups in the current image and groups in the background model, wherein visual elements in the groups in the current image are the visual elements in the current image which are classified as the foreground by the classification unit, wherein visual elements in the groups in the background model are the visual elements whose classification information is the foreground, and wherein the visual elements in the groups in the background model are the visual elements which neighbour to corresponding portions of the visual elements in the groups in the current image; and an identification unit configured to identify whether the visual elements in the current image which are classified as the foreground by the classification unit are falsely classified or not according to the similarity measures determined by the similarity measure determination unit.

Wherein, the background image in the background model is obtained according to at least one previous image of the current image. And the classification information of the visual elements in the background model is obtained according to the visual elements which are identified as the foreground or the background in at least one previous image of the current image.

Taking advantage of the present invention, the accuracy of the foreground detection will be improved.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Please note that similar reference numerals and letters refer to similar items in the figures, and thus once an item is defined in one figure, it need not be discussed for following figures.

Generally, in a scene captured on a video, it is impossible that a real object (i.e. the foreground) suddenly appears or disappears in the video. That is to say, a real object will have a moving trajectory in the video. Therefore, in case a group of visual elements (e.g. one visual element, or, more than one visual element) in a current image of the video are the foreground, generally, the visual elements in at least one previous image of the current image which neighbour to the corresponding portions of the visual elements in this group will also be the foreground. Therefore, the inventor found that, in foreground detection, as for a group of visual elements in a current image of a video which comprises at least one visual element that is classified as the foreground, it could regard the visual elements which are identified as the foreground in the previous images of the current image and which neighbour to the corresponding portions of the visual elements in this group in the previous images of the current image as a reference to identify whether the visual elements in this group are falsely classified or not.

Therefore, according to the present disclosure, after the visual elements in a current image of a video are classified as the foreground or the background, as for the visual elements which are classified as the foreground, it will take into consideration the similarities between these visual elements and the visual elements which are identified as the foreground in the previous images and which neighbour to the corresponding portions of these visual elements in the previous images to identify whether these visual elements are falsely classified or not. For example, as for a group of visual elements in the current image which comprises at least one visual element that is classified as the foreground, the more the visual elements in this group that are similar to the visual elements which are identified as the foreground in the previous images and which neighbour to the corresponding portions of the visual elements in this group in the previous images are, such as texture/color/luminance of these visual elements are similar, the higher the probability that the visual elements in this group are correctly classified is, that is, the higher the probability that the visual elements in this group are the real object. Thereby, in case there are less visual elements in this group that are similar to the visual elements which are identified as the foreground in the previous images and which neighbour to the corresponding portions of the visual elements in this group in the previous images, the visual elements in this group will be identified as falsely classified.

Therefore, according to the present disclosure, even if the background includes movements (e.g. the water ripples or the leaves moving in the wind) in certain images of the video, or even if the graph segmentation algorithm with low accuracy is used to obtain the visual elements which are used for foreground detection, since the identified foreground/background classification results which are obtained in the previous processing will be used as a reference for the subsequent processing, the false foreground detection could be eliminated efficiently. Thus, the accuracy of the foreground detection will be improved.

(Hardware Configuration)

The hardware configuration that can implement the techniques described hereinafter will be described first with reference to FIG. 1.

The hardware configuration 100, for example, includes Central Processing Unit (CPU) 110, Random Access Memory (RAM) 120, Read Only Memory (ROM) 130, Hard Disk 140, Input Device 150, Output Device 160, Network Interface 170 and System Bus 180. Further, in one implementation, the hardware configuration 100 could be implemented by a computer, such as tablet computers, laptops, desktops or other suitable electronic device. In another implementation, the hardware configuration 100 could be implemented by a monitor, such as digital cameras, video cameras, network cameras or other suitable electronic device. Wherein, in case the hardware configuration 100 is implemented by the monitor, the hardware configuration 100 further includes Optical System 190 for example.

Figure 4:
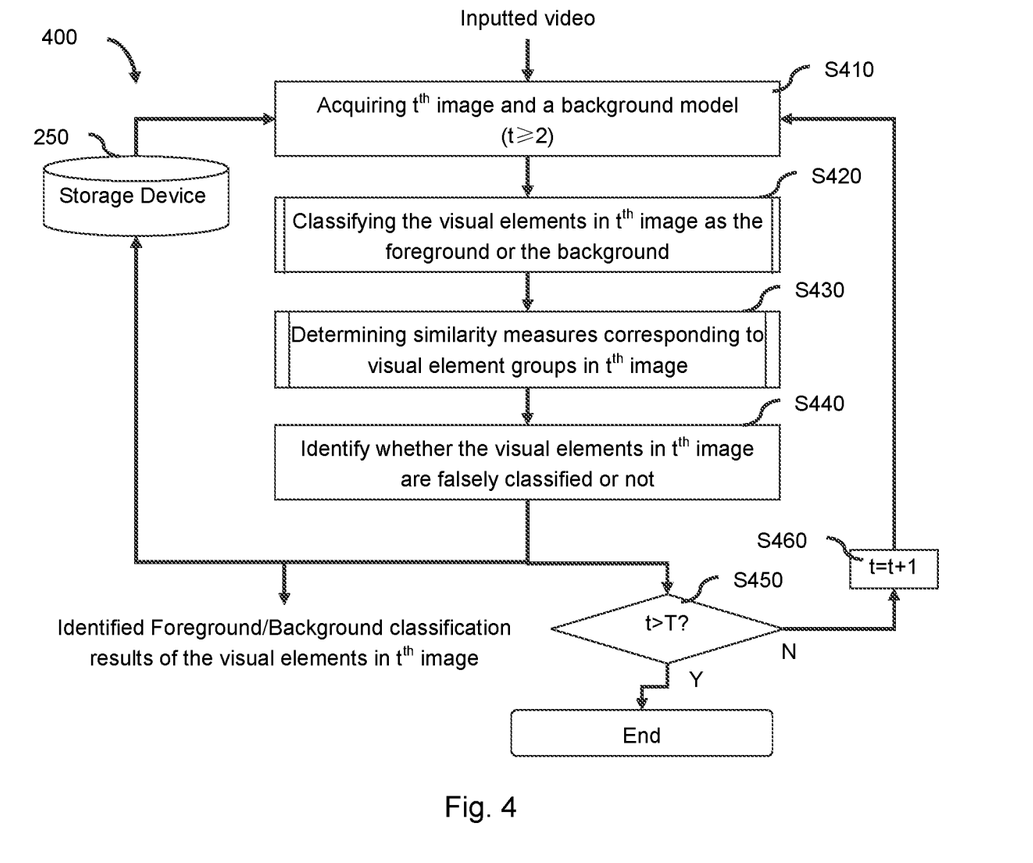
FIG. 4 schematically shows a flowchart of the image processing according to the embodiment of the present invention.

In one implementation, the image processing according to the present invention is configured by hardware or firmware and is acted as a module or component of the hardware configuration 100. For example, the image processing apparatus 200 which will be described in detail hereinafter with reference to FIG. 2 is acted as a module or component of the hardware configuration 100. In another implementation, the image processing according to the present disclosure is configured by software, stored in the ROM 130 or the Hard Disk 140, and executed by the CPU 110. For example, the procedure 400 which will be described in detail hereinafter with reference to FIG. 4 is acted as a program stored in the ROM 130 or the Hard Disk 140.

The CPU 110 is any suitable programmable control devices (such as processors) and could execute a variety of functions, to be described hereinafter, by executing a variety of application programs that are stored in the ROM 130 or the Hard Disk 140 (such as memories). The RAM 120 is used to temporarily store the program or the data that are loaded from the ROM 130 or the Hard Disk 140, and is also used as a space wherein the CPU 110 executes the variety of procedures, such as carrying out the techniques which will be described in detail hereinafter with reference to FIG. 4 to FIG. 6, as well as other available functions. The Hard Disk 140 stores many kinds of information, such as an operating system (OS), the various applications, a control program, a video, processing results for each image of a video, and/or, pre-defined data (e.g. Thresholds (THs)).

In one implementation, the Input Device 150 is used to allow the user to interact with the hardware configuration 100. In one instance, the user could input images/videos/data through the Input Device 150. In another instance, the user could trigger the corresponding processing of the present invention through the Input Device 150. Furthermore, the Input Device 150 can take a variety of forms, such as a button, a keypad or a touch screen. In another implementation, the Input Device 150 is used to receive images/videos which are outputted from special electronic devices, such as the digital cameras, the video cameras and/or the network cameras. In addition, in case the hardware configuration 100 is implemented by the monitor, the optical system 190 in the hardware configuration 100 will capture images/videos of a monitoring place directly.

In one implementation, the Output Device 160 is used to display the processing results (such as the foreground) to the user. And the Output Device 160 can take a variety of forms, such as a Cathode Ray Tube (CRT) or a liquid crystal display. In another implementation, the Output Device 160 is used to output the processing results to the subsequent processing, such as monitoring analysis that whether or not giving an alarm to the user, and so on.

The Network Interface 170 provides an interface for connecting the hardware configuration 100 to the network. For example, the hardware configuration 100 could perform, via the Network Interface 170, data communication with other electronic device connected via the network. Alternatively, a wireless interface may be provided for the hardware configuration 100 to perform wireless data communication. The system bus 180 may provide a data transfer path for transferring data to, from, or between the CPU 110, the RAM 120, the ROM 130, the Hard Disk 140, the Input Device 150, the Output Device 160 and the Network Interface 170, and the like to each other. Although referred to as a bus, the system bus 180 is not limited to any specific data transfer technology.

The above described hardware configuration 100 is merely illustrative and is in no way intended to limit the invention, its application, or uses. And for the sake of simplicity, only one hardware configuration is shown in FIG. 1. However, a plurality of hardware configurations can also be used as needed.

(Image Processing)

The image processing according to the present disclosure will be described next with reference to FIG. 2 to FIG. 7B.

FIG. 2 is a block diagram illustrating the configuration of the image processing apparatus 200 according to the embodiment of the present disclosure. Wherein, some or all of the blocks shown in FIG. 2 could be implemented by dedicated hardware. As shown in FIG. 2, the image processing apparatus 200 comprises an acquisition unit 210, a classification unit 220, a similarity measure determination unit 230 and an identification unit 240.

In addition, a storage device 250 shown in FIG. 2 stores videos and the processing results (i.e. identified foreground/background classification results of the visual elements) for each image of the videos. For example, the videos are inputted by the user, or outputted from the special electronic device (e.g. the camera), or captured by the optical system as described in FIG. 1. Alternatively, the videos and the processing results could be stored in different storage devices. In one implementation, the storage device 250 is the ROM 130 or the Hard Disk 140 shown in FIG. 1. In another implementation, the storage device 250 is a server or an external storage device which is connected with the image processing apparatus 200 via the network (not shown).

Figure 1:
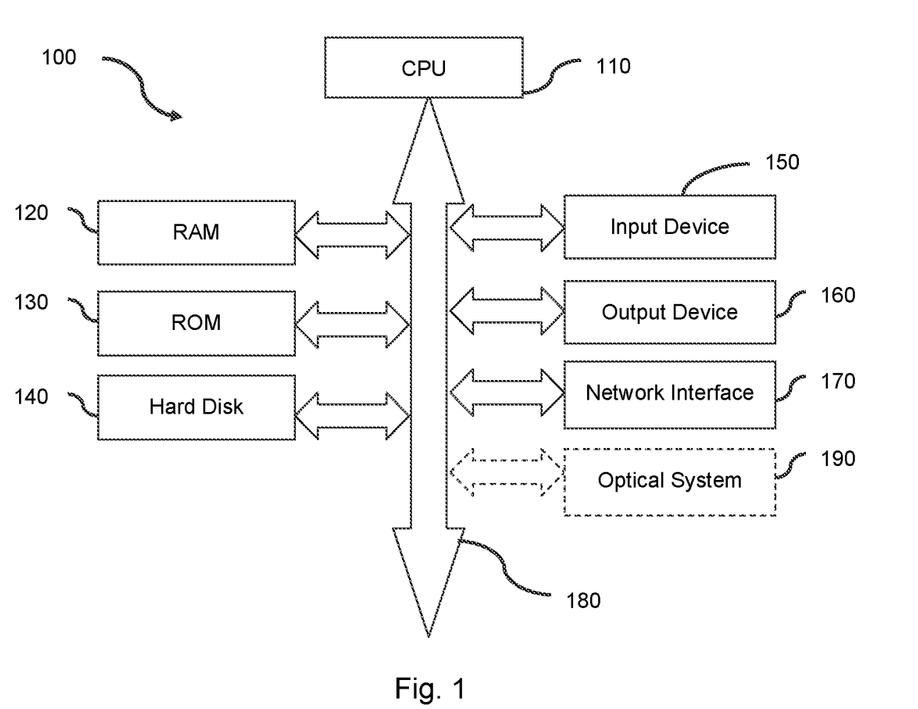
FIG. 1 is a block diagram schematically showing the hardware configuration that can implement the techniques according to the embodiments of the present invention.
Figure 2:
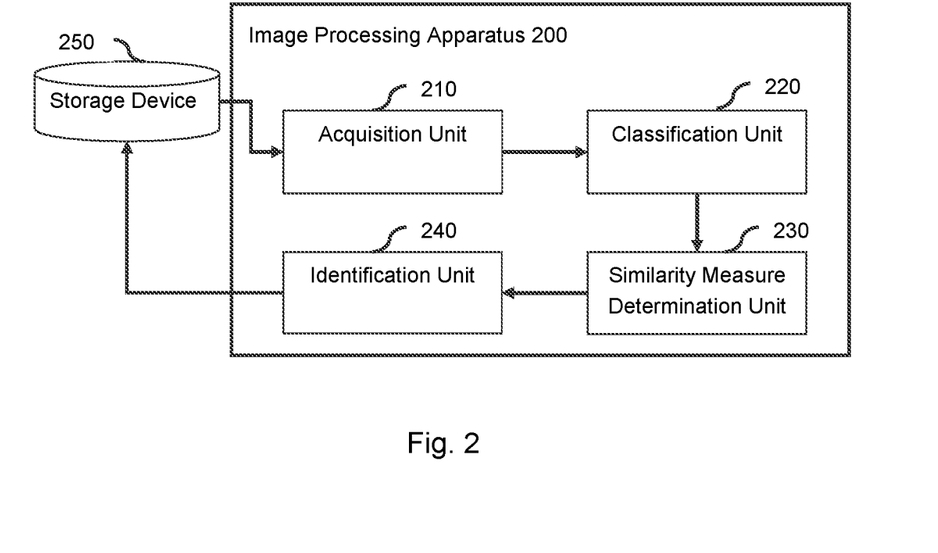
FIG. 2 is a block diagram illustrating the configuration of an image processing apparatus according to the embodiment of the present invention.

First, in one implementation, for example, in case the hardware configuration 100 shown in FIG. 1 is implemented by the computer, the Input Device 150 receives a video which is outputted from the special electronic device (e.g. the camera) or is input by the user. Second, the Input Device 150 transfers the received video to the image processing apparatus 200 via the system bus 180. In another implementation, for example, in case the hardware configuration 100 is implemented by the monitor, the image processing apparatus 200 directly receives a video which is captured by the optical system 190.

And then, as shown in FIG. 2, in one aspect, the acquisition unit 210 acquires a current image from the received video (i.e. the inputted video). For example, the current image is the $t^{th}$ image, wherein, t is the natural number and $2 \leq t \leq T$, T is the total number of the images of the inputted video. In another aspect, the acquisition unit 210 acquires a background model from the storage device 250. Wherein, the background model comprises a background image and classification information of the visual elements. Wherein, the classification information of the visual elements comprises the foreground and the background. Hereinafter, the "classification information of the visual elements" will be regarded as "foreground/background classification information of the visual elements".

The background image in the background model is obtained according to at least one previous image of the $t^{th}$ image. That is, the background image is obtained according to at least one image of the video in a certain duration time previous to the $t^{th}$ image, and the certain duration time is not limited and is set based on experimental statistics and/or experience. In one instance, the background image is an average image of the previous images of the $t^{th}$ image. In another instance, the background image is any one of the previous images of the $t^{th}$ image. In the other instance, the background image is obtained timely according to models which are generated for each pixel based on for example Gaussian Models. However, it is readily apparent that it is not necessarily limited thereto.

The foreground/background classification information of the visual elements in the background model is obtained according to the visual elements which are identified as the foreground or the background in at least one previous image of the $t^{th}$ image. In one instance, the foreground/background classification information of the visual elements is obtained by averaging the identified foreground/background classification results of the visual elements in the previous images of the $t^{th}$ image. In another instance, the foreground/background classification information of the visual elements is the identified foreground/background classification results of the visual elements in any one of the previous images of the $t^{th}$ image. In the other instance, the foreground/background classification information of the visual elements is obtained timely according to models which are generated for each visual element based on for example Gaussian Models. However, it is readily apparent that it is not necessarily limited thereto.

Figure 3A:
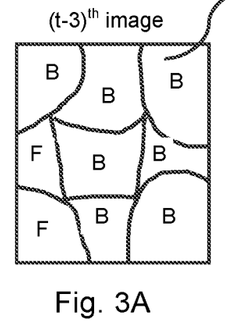
FIGS. 3A to 3H schematically shows the foreground/background classification results of the visual elements in the previous images of the current image and the foreground/background classification information of the visual elements in the background model according to the present invention.
Figure 3B:
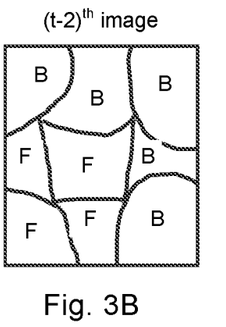
Figure 3C:
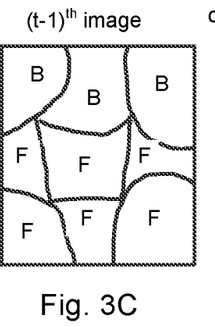
Figure 3D:
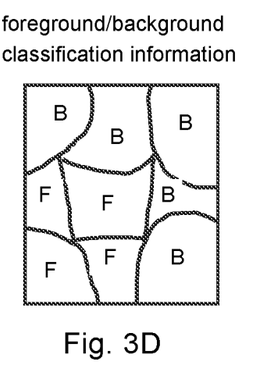
Figure 3E:
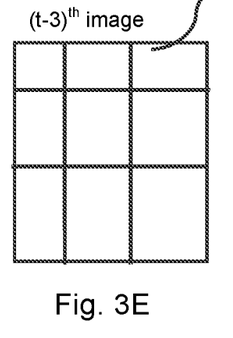
Figure 3F:
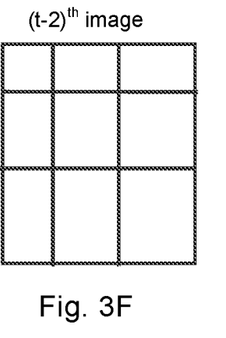
Figure 3G:
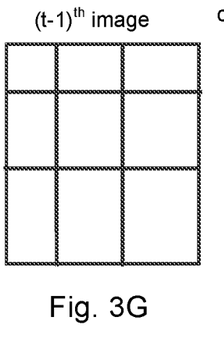
Figure 3H:
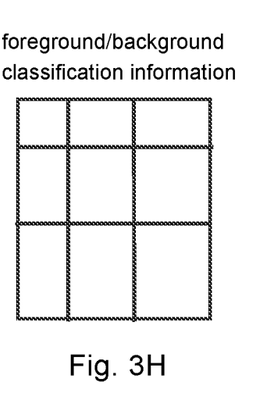

For example, assuming that the visual elements are superpixels, and assuming that the foreground/background classification information of the visual elements in the background model is obtained according to the identified foreground/background classification results of the visual elements in three previous images of the $t^{th}$ image, wherein the three previous images of the $t^{th}$ image for example are $(t-3)^{th}$ image shown in FIG. 3A, $(t-2)^{th}$ image shown in FIG. 3B and $(t-1)^{th}$ image shown in FIG. 3C, wherein one block in the images shown in FIG. 3A to 3C represents one visual element, wherein "B" or "F" in each block represents this visual element is identified as "background" or "foreground", hence, in case the averaging operation is executed, the obtained foreground/background classification information of the visual elements in the background model is shown in FIG. 3D for example. Likewise, for example, in case the visual elements are DCT blocks, FIG. 3E to 3G shows the three previous images of the $t^{th}$ image, and FIG. 3H shows the obtained foreground/background classification information of the visual elements in the background model in case the averaging operation is executed. In addition, in case the visual elements are pixels, the foreground/background classification information of the visual elements in the background model could be obtained in the same manner.

In addition, in case one of the previous images of the $t^{th}$ image is selected as the background image in the background model, and in case the identified foreground/background classification results of the visual elements in one of the previous images of the $t^{th}$ image is selected as the foreground/background classification information of the visual elements in the background model, these two previous images could be the same image or the different image.

Referring back to FIG. 2, after the acquisition unit 210 acquires the $t^{th}$ image and the background model, the classification unit 220 classifies the visual elements in the $t^{th}$ image as the foreground or the background according to the $t^{th}$ image and the background image in the background model.

Then, the similarity measure determination unit 230 determines similarity measures between groups (i.e. visual element groups) in the $t^{th}$ image and groups (i.e. visual element groups) in the background model. Wherein, the visual elements in the groups in the background model are the visual elements whose classification information is the foreground, and wherein the visual elements in the groups in the background model are the visual elements which neighbour to corresponding portions of the visual elements in the groups in the image. Wherein, the groups in the $t^{th}$ image could be determined according to any of manners, such as set by the user, determined by clustering the visual elements in the $t^{th}$ image which are classified as the foreground by the classification unit 220, etc. Wherein, each of the groups in the $t^{th}$ image comprises at least one visual element, and visual elements in the each of the groups are the visual elements in the $t^{th}$ image which are classified as the foreground by the classification unit 220. Wherein, as for any one of the groups in the $t^{th}$ image, each of the visual elements in this group corresponds to one corresponding portion of this visual element in the background model. And as for any one of the visual elements in this group, the corresponding portion of this visual element is a portion whose position in the background model is same as position of this visual element in the $t^{th}$ image. Wherein, as for any one of the groups in the $t^{th}$ image, the larger the similarity measure corresponding to this group is, the higher the probability that the visual elements in this group are correctly classified is, that is, the higher the probability that the visual elements in this group are the real object is.

And then, the identification unit 240 identifies whether the visual elements in the $t^{th}$ image which are classified as the foreground by the classification unit 220 are falsely classified or not according to the similarity measures determined by the similarity measure determination unit 230.

Finally, after the visual elements in the $t^{th}$ image are identified by the identification unit 240, in one aspect, the identification unit 240 transfers the identified foreground/background classification results of the visual elements in the $t^{th}$ image to the storage device 250, so that the corresponding information stored in the storage device 250 could be updated and the background model which will be used for the next image (e.g. $(t+1)^{th}$ image) could be acquired according to the updated information. In another aspect, the identification unit 240 transfers the identified foreground/background classification results of the visual elements in the $t^{th}$ image to the Output Device 160 shown in FIG. 1 via the system bus 180 for displaying the foreground in the $t^{th}$ image to the user or for outputting the foreground in the $t^{th}$ image to the subsequent processing, such as monitoring analysis, and so on.

In addition, generally, in foreground detection, the visual elements in the $1^{st}$ image of the inputted video will be regarded as the background acquiescently.

The flowchart 400 shown in FIG. 4 is the corresponding procedure of the image processing apparatus 200 shown in FIG. 2.

As shown in FIG. 4, in acquisition step S410, the acquisition unit 210 acquires the $t^{th}$ image from the inputted video and acquires the background model which comprises a background image and foreground/background classification information of visual elements from the storage device 250. Wherein, $2 \leq t \leq T$.

In classification step S420, the classification unit 220 classifies the visual elements in the $t^{th}$ image as the foreground or the background according to the $t^{th}$ image and the background image in the background model. In one implementation, the classification unit 220 classifies the visual elements in the $t^{th}$ image as the foreground or the background with reference to FIG. 5.

Figure 5:
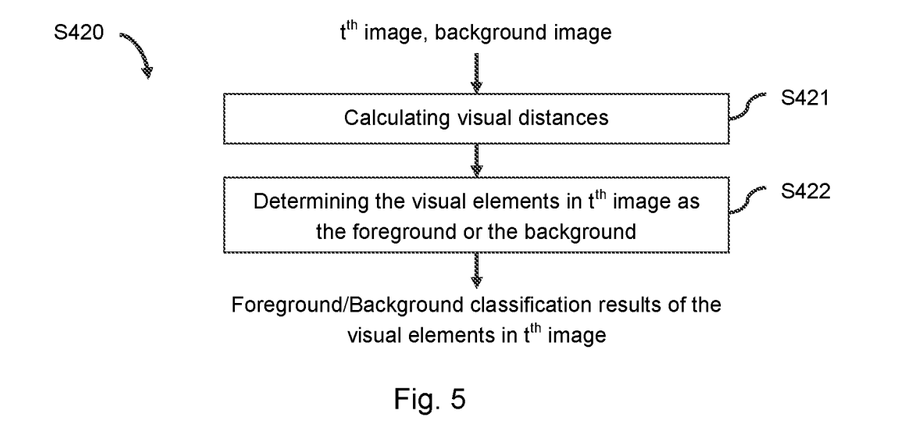
FIG. 5 schematically shows a flowchart of the step S420 as shown in FIG. 4 according to the present invention.

As shown in FIG. 5, in step S421, as for each of the visual elements in the $t^{th}$ image, the classification unit 220 calculates a similarity measure between this visual element and corresponding visual element in the background image. Wherein, the corresponding visual element is a visual element whose position in the background image is same as the position of this visual element in the $t^{th}$ image. Hereinafter, the similarity measures between the visual elements in the $t^{th}$ image and the corresponding visual elements in the background image will be regarded as "visual distances between the visual elements in the $t^{th}$ image and the corresponding visual elements in the background image". Wherein, as for anyone of the visual elements in the $t^{th}$ image, the larger the corresponding visual distance is, the more the differences (i.e. changes) contains between this visual element and the corresponding visual element in the background image, that is, the higher the probability that this visual element is the foreground is.

In one implementation, as for each of the visual elements in the $t^{th}$ image, the visual distance between this visual element and the corresponding visual element in the background image is calculated according to feature values of these two visual elements. For example, an absolute difference between the feature values of these two visual elements is regarded as the corresponding visual distance. It is readily apparent that it is not necessarily limited thereto. Wherein, the feature value of one visual element in one image could be determined according to channel features of this visual element in the image. For example, in case the image is in YCbCr color space, one visual element includes Y(Luminance) channel feature, Cb(Blue) channel feature and Cr(Red) channel feature. In case the image is in RGB color space, one visual element includes Red channel feature, Green channel feature and Blue channel feature.

Referring back to FIG. 5, in step S422, the classification unit 220 classifies the visual elements in the $t^{th}$ image as the foreground or the background according to a predefined threshold (e.g. TH1) and the visual distances which are obtained from the step S421. Taking one visual element in the $t^{th}$ image for example, in case the corresponding visual distance obtained in the step S421 is larger than the TH1, the classification unit 220 classifies this visual element as the foreground. Otherwise, this visual element will be classified as the background.

Referring back to FIG. 4, in similarity measure determination step S430, the similarity measure determination unit 230 determines the similarity measures between the groups in the $t^{th}$ image and the groups in the background model. Wherein, the visual elements in the groups in the background model are the visual elements whose classification information is the foreground, and wherein the visual elements in the groups in the background model are the visual elements which neighbour to corresponding portions of the visual elements in the groups in the $t^{th}$ image. In one implementation, as for any one of the groups in the $t^{th}$ image, the similarity measure determination unit 230 determines the similarity measure corresponding to this group with reference to FIG. 6.

Figure 6:
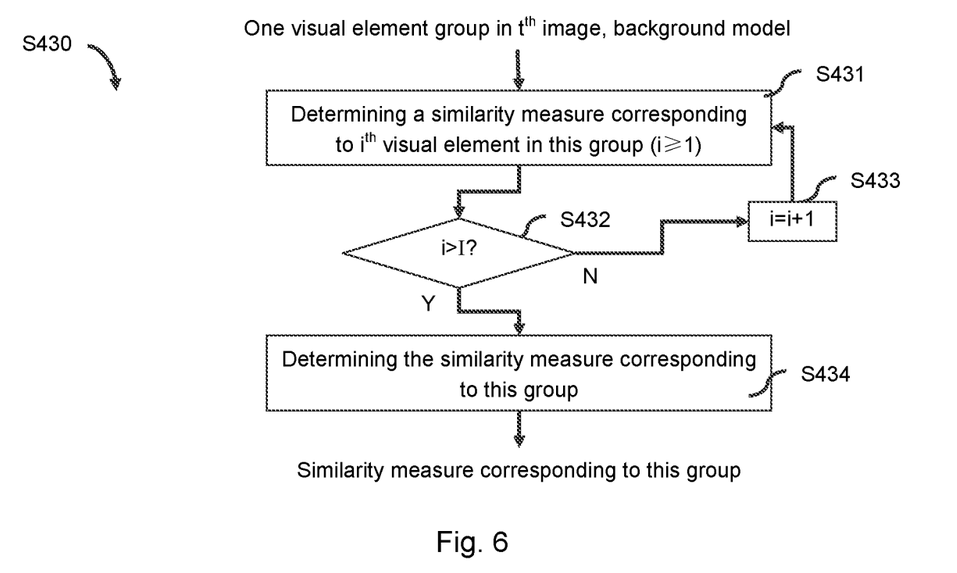
FIG. 6 schematically shows a flowchart of the step S430 as shown in FIG. 4 according to the present invention.

As shown in FIG. 6, in step S431, as for the $i^{th}$ visual element in one group in the $t^{th}$ image, wherein 1≤i≤I and I is the total number of the visual elements in this group, the similarity measure determination unit 230 determines a similarity measure corresponding to the $i^{th}$ visual element according to the visual elements in one of the groups in the background model. Wherein, the visual elements in this group in the background model are the visual elements whose classification information is the foreground, and wherein the visual elements in this group in the background model are the visual elements which neighbour to the corresponding portion of the $i^{th}$ visual element. Wherein, as for any one of the visual elements in this group in the $t^{th}$ image, the larger the similarity measure corresponding to this visual element is, the higher the probability that this visual element is the foreground is.

Figure 7A:
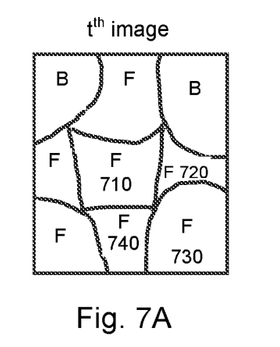
FIGS. 7A to 7B schematically shows a current image and the foreground/background classification information of the visual elements in the background model according to the present invention.
Figure 7B:
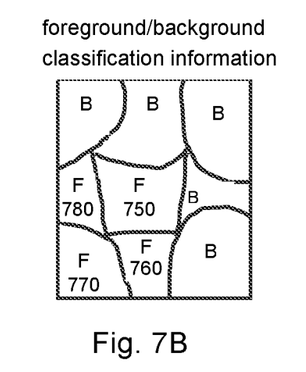

Taking the $t^{th}$ image shown in FIG. 7A and the foreground/background classification information of the visual elements in the background model shown in FIG. 7B for example, wherein the visual elements are the super-pixels for example. As shown in FIG. 7A, "B" or "F" in each visual element of the $t^{th}$ image for example represents this visual element is classified as "background" or "foreground" by the classification unit 220 in the classification step S420, and the group corresponding to which the similarity measure is being determined comprises the visual elements 710-740 for example. Taking the visual element 710 in this group for example, the similarity measure determination unit 230 determines the similarity measure corresponding to the visual element 710 as follows. Wherein, as for the visual element 710 in this group, the corresponding portion of the visual element 710 is the visual element 750 shown in FIG. 7B, and the visual elements whose classification information is the foreground in the background model and which neighbour to the visual element 750 in the background model are for example the visual elements 760-780 shown in FIG. 7B.

Thus, firstly, as for each of the visual elements 760-780, taking the visual element 760 for example, the similarity measure determination unit 230 determines a similarity measure between the visual element 710 and the visual element 760 according to the feature values of these two visual elements. For example, an absolute difference between the feature values of these two visual elements is regarded as the corresponding similarity measure. It is readily apparent that it is not necessarily limited thereto. As described above, the feature value of one visual element in one image could be determined according to the channel features of this visual element in the image. Therefore, the feature value of the visual element 710 is determined according to its channel features in the $t^{th}$ image. The feature value of the visual element 760 is determined according to feature values of visual elements in the previous images of the $t^{th}$ image, wherein positions of these visual elements in the previous images are same as the position of the visual element 760 and the foreground/background classification results of these visual elements are used to determine the foreground/background classification information of the visual element 760.

And then, after the similarity measure determination unit 230 determines the similarity measure between the visual element 710 and the visual element 760 (e.g. regarded as Sim1), the similarity measure between the visual element 710 and the visual element 770 (e.g. regarded as Sim2) and the similarity measure between the visual element 710 and the visual element 780 (e.g. regarded as Sim3), the similarity measure determination unit 230 determines the similarity measure corresponding to the visual element 710 according to the determined similarity measures (i.e. Sim1, Sim2 and Sim3). In one instance, the average value of Sim1 to Sim3 is determined as the similarity measure corresponding to the visual element 710. In another instance, one similarity measure among Sim1 to Sim3 whose value is maximal is determined as the similarity measure corresponding to the visual element 710. However, it is readily apparent that it is not necessarily limited thereto.

Referring back to FIG. 6, in step S432, the similarity measure determination unit 230 judges whether all of the visual elements in this group have been processed or not. That is, judging whether i is larger than I or not. If not, in step S433, the similarity measure determination unit 230 sets i=i+1 and repeats the above-mentioned steps S431-S432. Otherwise, the procedure proceeds to step S434.

In step S434, the similarity measure determination unit 230 determines the similarity measure corresponding to this group in the $t^{th}$ image according to the similarity measures determined in the step S431. In one implementation, the similarity measure determination unit 230 determines the similarity measure corresponding to this group as follows. Firstly, the similarity measure determination unit 230 obtains a counting number by calculating the number of the visual elements in this group the similarity measures corresponding to which are larger than a predefined threshold (e.g. TH2). Then, the similarity measure determination unit 230 determines the similarity measure corresponding to this group by calculating a ratio of the counting number to the total number of the visual elements in this group. For example, the ratio is calculated by using the following formula (1):

$$\text{Ratio} = \frac{CountingNumber}{TotalNumber} \qquad (1)$$

In addition, in case this group comprises only one visual element, the similarity measure determination unit 230 regards the similarity measure corresponding to this visual element as the similarity measure corresponding to this group directly.

Referring back to FIG. 4, in identification step S440, the identification unit 240 identifies whether the visual elements in the $t^{th}$ image which are classified as the foreground in the classification step S420 are falsely classified or not according to the similarity measures determined in the similarity measure determination step S430.

In one implementation, as for any one of the groups in the $t^{th}$ image, the identification unit 240 identifies whether the visual elements in this group are falsely classified or not according to a predefined threshold (e.g. TH3) and the similarity measure corresponding to this group. As described above, as for any one of the groups in the $t^{th}$ image, the larger the similarity measure corresponding to this group is, the higher the probability that the visual elements in this group are the real object is. Therefore, for example, in case the similarity measure corresponding to this group (i.e. the ratio) is calculated by using the above-mentioned formula (1) and is less than the TH3, which means the probability that the visual elements in this group are the real object is low, the identification unit 240 identifies the visual elements in this group are falsely classified. That is, the visual elements in this group which are classified as the foreground by the classification unit 220 are false foreground. Otherwise, in case the similarity measure corresponding to this group (i.e. the ratio) is not less than the TH3, the identification unit 240 identifies the visual elements in this group are real foreground (i.e. real object). In other words, as for the visual elements in any one of group, the identification unit 240 identifies the visual elements as follows:

$$VisualElements = \begin{cases} FalseForeground, & Ratio < TH3 \\ RealForeground, & Ratio \geq TH3 \end{cases}$$

As shown in FIG. 4, after the visual elements in the $t^{th}$ image are identified by the identification unit 240 in the identification step S440, in one aspect, the identification unit 240 transfers the identified foreground/background classification results of the visual elements in the $t^{th}$ image to the storage device 250 shown in FIG. 2 or to the Output Device 160 shown in FIG. 1. In another aspect, in step S450, the image processing apparatus 200 judges whether all of the images in the inputted video have been processed. That is, judging whether t is larger than T or not. If not, in step S460, the image processing apparatus 200 sets t=t+1 and repeats the above-mentioned steps S410-S450. Otherwise, the procedure shown in FIG. 4 will be finished.

According to the present disclosure, since the identified foreground/background classification results which are obtained in the previous processing will be used as a reference for the subsequent processing, the false foreground detection could be eliminated efficiently. Thus, the accuracy of the foreground detection will be improved.

(A Monitoring System)

Figure 8:
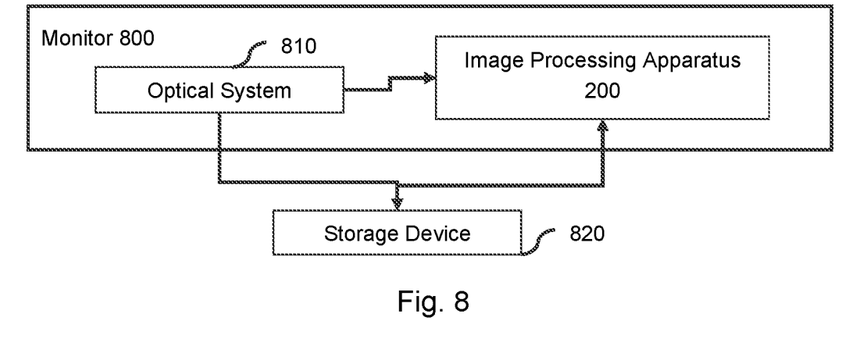
FIG. 8 illustrates the arrangement of an exemplary monitor according to the present invention.

As described above, the present disclosure could be implemented by a computer (e.g. tablet computers, laptops or desktops) or could be implemented by a monitor (e.g. digital cameras, video cameras or network cameras). The present disclosure is implemented by a network camera for example, after the network camera is triggered the corresponding processing of the present disclosure, the network camera could output the corresponding processing results (i.e. the foreground) to the subsequent processing, such as monitoring analysis that whether or not giving an alarm to the user. Therefore, as an exemplary application of the present disclosure, an exemplary monitor (e.g. a network camera) will be described next with reference to FIG. 8. FIG. 8 illustrates the arrangement of an exemplary monitor 800 according to the present disclosure. As shown in FIG. 8, the monitor 800 comprises an optical system 810 and the image processing apparatus 200 as described above.

In addition, a storage device 820 shown in FIG. 8 stores captured videos and the processing results (i.e. foreground/background classification results of the visual elements) for each image of the captured videos. In one implementation, the storage device 820 is an internal storage device of the monitor 800. In another implementation, the storage device 820 is a server or an external storage device which is connected with the monitor 800 via the network (not shown).

As shown in FIG. 8, firstly, the optical system 810 continuously captures a video of a monitoring place (e.g. an illegal parking area) and stores the captured video to the storage device 820.

And then, the image processing apparatus 200 identifies visual elements in images of the captured video as foreground or background with reference to FIG. 2 to FIG. 7B and stores the identified foreground/background classification results of the visual elements to the storage device 820.

The monitor 800 outputs the detected foreground to a processor which is used to execute a monitoring analysis for example, assuming that the monitoring place is an illegal parking area and the pre-defined alarming rule is that giving an alarm to the user in case cars or other objects are parked in the illegal parking area, that is to say, the illegal parking area is the background and the cars or other objects that appear in the illegal parking area are the foreground. Thereby, the monitor 800 will continuously capture the video of the illegal parking area and execute the foreground detection on the captured video with reference to FIG. 8. And in case a car is detected, the monitor 800 will output the car to the processor, so that the processor could give an alarm to the user. As described above, in case there are trees in the illegal parking area and the leaves move in the wind in a certain period, the monitor 800 will not detect the moving leaves as the foreground falsely, thus, the processor will not give the wrong alarm to the user.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. An image processing apparatus, comprising:
   an acquisition unit configured to acquire a current image from an inputted video and a model which comprises classification information, wherein the classification information comprises visual elements as foreground and visual elements as background;
   a classification unit configured to classify the visual elements in the current image as the foreground or the background according to the classification information in the model;
   a similarity measure determination unit configured to determine a similarity measure between
      a visual element in a first group, in which the visual element is determined as foreground by the classification unit, in the current image and
      a visual element as foreground in a second group in the model, the second group being spatially neighbour to a corresponding group to the first group in the current image; and
   an identification unit configured to identify that the visual elements in the current image which are classified as the foreground by the classification unit are falsely classified in a case where the determined similarity measure is less than a threshold.

2. The image processing apparatus according to claim 1, wherein, visual elements as foreground and visual elements as background are obtained according to the visual elements which are identified as the foreground or the background in at least one previous image of the current image.

3. The image processing apparatus according to claim 1, wherein, as for any one of the visual elements in the first group in the current image, a position of a group in the model is same as position of the first group in the current image.

4. The image processing apparatus according to claim 1, wherein in case a group comprises more than one visual element, the similarity measure determination unit determines the similarity measure corresponding to the group according to a ratio of a number of visual elements which are larger than a predefined threshold to a total number.

5. An image processing method, comprising:
   an acquisition step of acquiring a current image from an inputted video and a model which comprises classification information, wherein the classification information comprises visual elements as foreground and visual elements as background;
   a classification step of classifying the visual elements in the current image as the foreground or the background according to the classification information in the model;
   a similarity measure determination step of determining a similarity measure between
      a visual element in a first group in which the visual element is determined as foreground by the classification unit, in the current image and
      a visual element as foreground in a second group in the model, the second group being spatially neighbour to a corresponding group to the first group in the current image; and
   an identification step of identifying that the visual elements in the current image which are classified as the foreground in the classification step are falsely classified in a case where the determined similarity measure is less than a threshold.

6. A monitoring system, comprising:
   an acquiring device configured to acquire a video;
   an image processing apparatus configured to identify visual elements in images of the acquired video as foreground or background, the image processing apparatus comprising:
      an acquisition unit configured to acquire a current image from an inputted video and a model which comprises classification information, wherein the classification information comprises visual elements as foreground and visual elements as background;
      a classification unit configured to classify the visual elements in the current image as the foreground or the background according to the classification information in the model;
      a similarity measure determination unit configured to determine a similarity measure between
         a visual element in a first group, in which the visual element is determined as foreground by the classification unit, in the current image and
         a visual element as foreground in a second group in the model, the second group being spatially neighbour to a corresponding group to the first group in the current image; and
      an identification unit configured to identify that the visual elements in the current image which are classified as the foreground by the classification unit are falsely classified in a case where the determined similarity measure is less than a threshold; and
   a storage device configured to store the acquired video and processing results determined by the image processing apparatus.

* * * * *